(12) United States Patent
Shirai et al.

(10) Patent No.: US 8,393,070 B2
(45) Date of Patent: Mar. 12, 2013

(54) METHOD AND PRODUCTION LINE FOR LAMINATE ASSEMBLY

(75) Inventors: Kuniyasu Shirai, Ichinomiya (JP); Kazuo Hiramitsu, Ichinomiya (JP); Sotaro Ishihara, Ichinomiya (JP)

(73) Assignee: Yamada Dobby Co., Ltd., Ichinomiya-shi (JP)

( * ) Notice: Subject to any disclaimer, the term of this patent is extended or adjusted under 35 U.S.C. 154(b) by 603 days.

(21) Appl. No.: 12/591,972

(22) Filed: Dec. 7, 2009

(65) Prior Publication Data

US 2010/0154968 A1 Jun. 24, 2010

(30) Foreign Application Priority Data

Dec. 19, 2008 (JP) ................. 2008-323838

(51) Int. Cl.
*G01R 31/28* (2006.01)

(52) U.S. Cl. ............. 29/593; 29/602.1; 29/607; 29/738; 156/64; 156/378; 270/58.09; 270/58.11; 270/58.14

(58) Field of Classification Search ................. 29/592.1, 29/602.1, 607, 738; 156/64, 378; 270/58.09, 270/58.11, 58.14
See application file for complete search history.

(56) References Cited

U.S. PATENT DOCUMENTS

| 4,073,373 | A | * | 2/1978 | Crowley et al. | ............ 198/418.3 |
| 4,586,236 | A | * | 5/1986 | Jones | .......................... 29/564.6 |
| 5,609,333 | A | * | 3/1997 | Mandel et al. | ............. 270/58.09 |
| 5,649,697 | A | * | 7/1997 | Kurishita et al. | ................ 271/97 |

FOREIGN PATENT DOCUMENTS

| JP | 2720138 | 8/1994 |
| JP | 7-115756 A | 5/1995 |
| JP | 2004-159417 A | 6/2004 |

OTHER PUBLICATIONS

Notification of Reasons for Refusal dated Oct. 16, 2012 for Application No. 2008-323838.

* cited by examiner

*Primary Examiner* — Paul D Kim
(74) *Attorney, Agent, or Firm* — Edwards Wildman Palmer LLP

(57) ABSTRACT

The production line according to the present invention is provided with a pressurization measurement apparatus adjacent to a press-working apparatus, a temporary laminate assembly worked and laminated by a press in the press-working apparatus is sent to the pressurization measurement apparatus, and a laminate assembly is produced by being pressurized and being subjected to regular caulking by a hydraulic servo press of the pressurization measurement apparatus. At this time, the lamination height of a regularly caulked laminate assembly is measured by a linear scale secured at the pressurization measurement apparatus. The main controller of a control apparatus inputs data of the measured lamination height, and adds and subtracts the set number of thin plates to be laminated of a laminate assembly by controlling the laminating means of the press-working apparatus so that the measurement lamination height is matched to the set lamination height using the measured lamination height, the preset lamination height, the height dimension tolerance, and the tolerance for judging the number of thin plates.

13 Claims, 9 Drawing Sheets

METHOD AND PRODUCTION LINE FOR LAMINATE ASSEMBLY

BACKGROUND OF THE INVENTION

1. Field of the Invention

The present invention relates to a method and a production line for a laminate assembly formed by laminating thin plates, and in further detail, to a method and a production line for a laminate assembly having high accuracy in height by reflecting measurement data in the number of thin plates to be laminated of a newly laminated laminate assembly while measuring the lamination height of the laminate assembly press-worked and laminated.

2. Description of Related Art

For example, a motor core produced as an electric component is formed as a laminate assembly by punching out thin steel plates to a predetermined shape by press-working, laminating and caulking the same. A method has been known by Japanese Patent Publication No. 2720138, by which a laminated iron core used as a motor core is produced by forming caulking parts in respective laminated steel plates, which composes a laminate assembly, by means of cutting and lifting, and fitting the caulking parts, adjacent to each other, of the laminated steel plates which are stacked up under pressure.

The method for producing the laminated iron cores is able to produce the laminated iron cores without strain, damage to the coating on iron core pieces, and buckling without any gaps remaining between the laminated iron core pieces (punched-out laminated steel plates). The laminated iron cores have through-holes drilled left and right alternately toward the lamination direction at the end parts of the caulking parts of the laminated iron core pieces. The folded-over root part of the caulking part is positioned in the through-hole of the adjacent iron core pieces. Accordingly, there will be no cases where the inclined planes of the caulking parts of the adjacent laminated iron cores are brought into contact, wherein the lamination height is prevented from becoming high due to occurrence of gaps between the iron core pieces by the inclined planes being brought into contact.

However, although the laminated iron core described in the patent publication mentioned above prevents the lamination height thereof from becoming high by eliminating the gaps between respective iron core pieces which are laminated, there exists unevenness in plate thickness within the tolerance (an error in plate thickness within the dimensional tolerance) in the respective iron core pieces. Therefore, the unevenness in the plate thickness existing in the respective iron core pieces greatly influences the lamination height of the laminated iron cores which are stacked up, wherein when the laminated iron core is produced by laminating by the set number of thin plates, unevenness is brought about more or less in the lamination height of laminated iron cores produced.

Therefore, conventionally, in order to secure a set lamination height, the thickness of before-machining iron core pieces (laminated steel plate) was measured, the set lamination height was divided by the thickness of the iron core pieces, the number of thin plates to be laminated was calculated and set. However, since the plate thickness of the iron core pieces is measured before machining, the measurement is difficult to be reflected in the lamination height of the laminated iron core after being laminated, wherein there is a problem that laminated iron cores in which the lamination height of actually laminated iron core deviates from the tolerance of the set height are produced.

In addition, conventionally, there were cases where iron core pieces were laminated, the laminate assembly was pressurized, the height of the laminated iron cores in a caulked and fixed state was measured, and the setting of the number of thin plates to be laminated of laminated iron cores was changed based on a difference between the measurement lamination height and the set height. The setting change of the number of thin plates to be laminated of laminated iron cores was not an automated process in the production line, but was carried out based on the measurement value obtained by an operator having measured the height of the laminated iron cores after having been taken out from the production line. Therefore, the timing of reflecting the measurement data in the lamination process in the production line was delayed, resulting in a number of non-conforming articles, wherein such a problem occurred by which the yield of the products was worsened.

SUMMARY OF THE INVENTION

It is therefore an object of the present invention to provide a method and a production line for a laminate assembly, which is able to improve the accuracy in lamination height of laminate assembly and to produce laminate assemblies at a satisfactory yield ratio by reducing non-conforming articles.

The object of the present invention can be achieved by the method and the production line for laminate assemblies, which are composed as shown below.

That is, a method for producing a laminate assembly of the present invention comprises the steps of: forming a laminate assembly by laminating thin plates, which are punched out by press-working means, by a set number of thin plates by laminating means; measuring a lamination height of the laminate assembly by measuring means; and controlling the laminating means to adjust a set number of thin plates to be laminated of the laminate assembly by addition and subtraction so that a measurement lamination height is matched to a set lamination height by controlling means using a measured lamination height, a preset lamination height, a height dimension tolerance, and a tolerance for judging the number of thin plates after measurement lamination height data measured by the measuring means is input into the controlling means.

According to the invention, since the lamination height of a laminate assembly formed by laminating thin plates by a set number of thin plates by the laminating means after the thin plates are punched out by the press-working means in the production line is measured by the measuring means, and the number of thin plates to be laminated by the laminating means is adjusted to be increased and decreased so that the measurement lamination height is matched to the set lamination height, a laminate assembly can be produced so that the height measurement data of the produced laminate assembly is reliably reflected in the number of thin plates to be laminated of newly press-worked and laminated laminate assemblies, and the lamination height of the newly worked and laminated laminate assembly is accommodated within the tolerance of the set lamination height. Therefore, the accuracy of the lamination height of the laminate assembly can be greatly improved, and the yield of the laminate assemblies when producing the same can be improved.

Here, it is preferable that the laminating step forms a temporary laminate assembly by temporarily caulking the caulking parts secured at thin plates by press-working, and the measuring step measures the lamination height of the laminate assembly in a state where the laminate assembly is pressurized at a lower measurement pressure than for a regular caulking after the temporarily caulked temporary laminate assembly is regularly caulked by being pressurized at a higher pressure than for the temporary caulking. According to the production method, it is possible to accurately measure the lamination height of a laminate assembly.

In addition, the controlling step may judge, when a difference between the measured lamination height and the preset lamination height is small, that a produced laminate assembly is a conforming article, and may judge, when the difference is large, that a produced laminate assembly is a non-conforming article. According to the production method, in the controlling step, it is possible to accurately judge the quality of produced laminate assemblies based on the measurement lamination height of the laminate assemblies, and it is also possible to classify the laminate assemblies.

Further, the controlling step may subtract a single thin plate from the number of thin plates to be laminated of a laminate assembly when the measurement lamination height is larger than the value obtained by adding the height dimension tolerance to the set lamination height, and may add a single thin plate to the number of thin plates to be laminated of a laminate assembly when the measurement lamination height is smaller than the value obtained by subtracting the height dimension tolerance from the set lamination height.

Here, as described above, it is preferable that a produced laminate assembly may be judged to be a non-conforming article when the measurement lamination height is larger than the value obtained by adding the height dimension tolerance to the set lamination height or when the measurement lamination height is smaller than the value obtained by subtracting the height dimension tolerance from the set lamination height.

Further, the controlling step may add a single thin plate to the number of thin plates to be laminated of a laminate assembly when the measurement lamination height is equal to or larger than the value obtained by subtracting the height dimension tolerance from the set lamination height and when the measurement lamination height is smaller than the value obtained by subtracting the tolerance for judging the number of thin plates from the set lamination height.

Still further, the controlling step may cause the number of thin plates to be laminated of a laminate assembly to remain unchanged when the measurement lamination height is larger than the value obtained by subtracting the tolerance for judging the number of thin plates from the set lamination height and the measurement lamination height is smaller than the value obtained by adding the tolerance for judging the number of thin plates to the set lamination height.

Also, the controlling step may subtract a single thin plate from the number of thin plates to be laminated of a laminate assembly when the measurement lamination height is larger than the value obtained by adding the tolerance for judging the number of thin plates to the set lamination height and the measurement lamination height is equal to or smaller than the value obtained by adding the height dimension tolerance to the set lamination height.

Here, as described above, a produced laminate assembly may be judged to be a conforming article when the measurement lamination height is equal to or larger than the value obtained by subtracting the height dimension tolerance from the set lamination height and the measurement lamination height is smaller than the value obtained by subtracting the tolerance for judging the number of thin plates from the set lamination height, when the measurement lamination height is larger than the value obtained by subtracting the tolerance for judging the number of thin plates from the set lamination height and the measurement lamination height is smaller than the value obtained by adding the tolerance for judging the number of thin plates to the set lamination height, or when the measurement lamination height is larger than the value obtained by adding the tolerance for judging the number of thin plates to the set lamination height and the measurement lamination height is equal to or smaller than the value obtained by adding the height dimension tolerance to the set lamination height.

Thus, the number of thin plates to be laminated of a laminate assembly may be adjusted by adding or subtracting a single thin plate based on comparison of the measurement lamination height to addition or subtraction of the height dimension tolerance or the tolerance for judging the number of thin plates with respect to the set lamination height. Therefore, the lamination height may be very minutely and accurately adjusted, wherein the unevenness in the lamination height of produced laminate assemblies may be accommodated within the dimensional tolerance, and the production yield may be greatly improved.

On the other hand, a production line for a laminate assembly according to the present invention comprises: press-working means for punching out a thin plate material by a press; laminating means for forming a laminate assembly by laminating punched-out thin plates by a set number of thin plates; means for measuring a lamination height of the laminate assembly; and controlling means for inputting data of measurement lamination height measured by the measuring means, determining an addition value or a subtraction value in the set number of thin plates to be laminated for the laminate assembly so that the measurement lamination height is matched to the set lamination height using the measurement lamination height, a preset lamination height, a height dimension tolerance, and a tolerance for judging the number of thin plates, and controlling so as to increase or decrease the number of thin plates to be laminated in the laminating means based on the addition or subtraction value.

According to the invention, since the lamination height of a laminate assembly formed by punching out a thin plate by press-working means in the production line and by laminating the thin plate by a set number of thin plates by the laminating means is measured by the measuring means, and the lamination height is adjusted to increase and decrease the number of thin plates to be laminated of the laminate assembly so that the measurement lamination height is matched to the set lamination height, the height measurement data of a produced laminate assembly is, as described above, reliably reflected in the number of thin plates to be laminated of a laminate assembly, which is newly press-worked and laminated, wherein the lamination height of a newly worked and laminated laminate assembly is accommodated within the tolerance of the set lamination height. Therefore, the accuracy of the lamination height of the laminate assembly can be greatly improved, and it is possible to improve the yield when producing laminate assemblies.

Here, the press-working means is structured so as to form a laminate assembly by laminating punched-out thin plates by a set number of thin plates and temporarily caulking the same, and the measuring means is provided in the pressurizing means for regularly caulking a temporarily caulked laminate assembly sent from the press-working means and is structured so as to measure the height of the laminate assembly in a state where the laminated assembly is pressurized with a smaller measurement pressurizing force than the pressurizing force for regular caulking after the laminate assembly is regularly caulked by the pressurizing means. According to the invention, it is possible to accurately measure the height of the laminate assembly in a state where the measurement pressurizing force is given after regular caulking.

In addition, the measuring means is structured so as to measure the lamination height of a laminate assembly by outputting the up and down position data of a slider of a press from a movable portion or a fixing portion of a linear scale in a state where the fixing portion of the linear scale for electrically measuring the absolute position of the movable portion is fixed at the main body frame of the press used as the pressurizing means, and the movable portion of the linear scale is fixed at the slider of the press.

In addition, it is preferable that the controlling means is provided with quality judging means for judging, when a difference between the measurement lamination height and the preset lamination height is small, that a produced laminate assembly is a conforming article, and judging, when the difference is great, that the produced laminate assembly is a non-conforming article. According to the production line, it is possible to judge the quality of the produced laminate assembly accurately based on the measurement lamination height of the laminate assembly, and classify the laminate assemblies.

Also, the controlling means is provided with a lamination number counter for setting the number of thin plates to be laminated based on which the laminating means laminates thin plates, and adjusts the set number of thin plates to be laminated of a laminate assembly by adding or subtracting the value of the lamination number counter based on the measurement lamination height, height dimension tolerance and the tolerance for judging the number of thin plates.

Further, the controlling means subtracts a single thin plate from the number of thin plates to be laminated of a laminate assembly when the measurement lamination height is larger than the value obtained by adding the height dimension tolerance to the set lamination height, adds a single thin plate to the number of thin plates to be laminated of a laminate assembly when the measurement lamination height is smaller than the value obtained by subtracting the height dimension tolerance from the set lamination height, adds a single thin plate to the number of thin plates to be laminated of a laminate assembly when the measurement lamination height is equal to or larger than the value obtained by subtracting the height dimension tolerance from the set lamination height and when the measurement lamination height is smaller than the value obtained by subtracting the tolerance for judging the number of thin plates from the set lamination height, causes the number of thin plates to be laminated of a laminate assembly to remain unchanged when the measurement lamination height is larger than the value obtained by subtracting the tolerance for judging the number of thin plates from the set lamination height and when the measurement lamination height is smaller than the value obtained by adding the tolerance for judging the number of thin plates to the set lamination height, and subtracts a single thin plate from the number of thin plates to be laminated of a laminate assembly when the measurement lamination height is larger than the value obtained by adding the tolerance for judging the number of thin plates to the set lamination height and when the measurement lamination height is equal to or smaller than the value obtained by adding the height dimension tolerance to the set lamination height.

According to the invention, the controlling means is able to adjust the lamination height very minutely and accurately, accommodate the unevenness in the lamination height of produced laminate assemblies within the dimensional tolerance, and greatly improve the yield of products.

DESCRIPTION OF THE PREFERRED EMBODIMENTS

Figure 1:
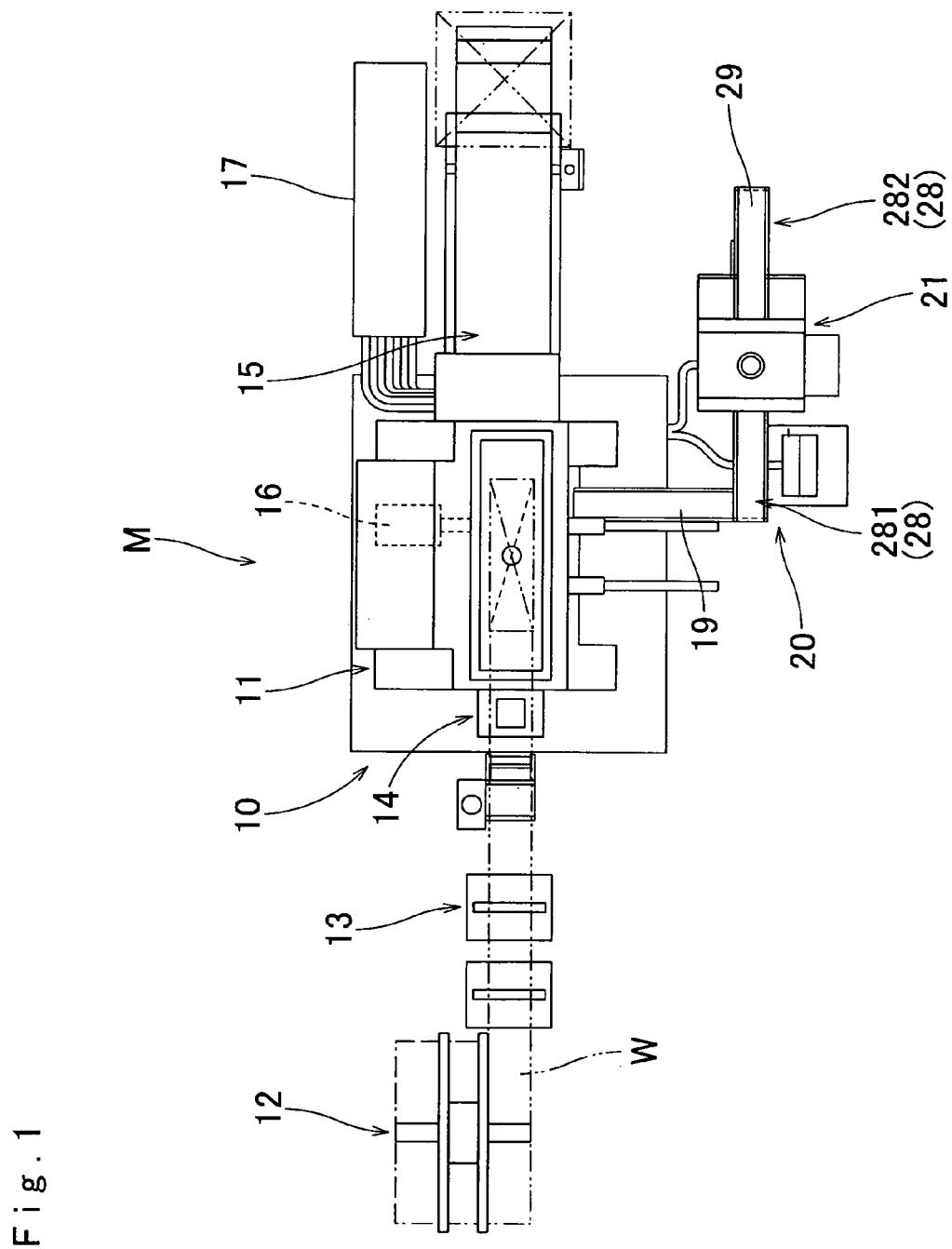
FIG. 1 is a plan view showing a production line of a laminate assembly according to an embodiment of the present invention.

Hereinafter, a description is given of the present invention based on the embodiment shown in the drawings. Also, the present invention is not limited to the embodiment. All modifications and variations in the matters of Claims or matters equivalent to the matters therein are considered to be included in the scope of Claims.

The production line M shown in FIG. 1 is a system for producing a laminate assembly 1 being, for example, a motor core. A band-shaped steel plate W being a thin plate material is wound around an uncoiler 12. The thin steel plate W led therefrom is caused to enter a press-working apparatus 10. The thin steel plate W is punched out by a press 11 of the press-working apparatus 10 to become lamination steel plates 3 of a predetermined shape. The respective lamination steel plates 3 are laminated one by one on an elevation base fitted in a recessed portion of a lower die of the press 11 and are subjected to temporary caulking. A predetermined number of lamination steel plates 3 are laminated, and a temporary laminate assembly 5 is produced in the press-working apparatus 10. The above-described press-working means is composed of the press 11, and the above-described thin plate is composed of the lamination steel plate 3.

In the production line M, a pressurization measurement apparatus 20 is provided adjacent to the press-working apparatus 10. The temporary laminate assembly 5 produced by the press 11 in the press-working apparatus 10 is sent to the pressurization measurement apparatus 20 and is pressurized by a hydraulic servo press 21 of the pressurization measurement apparatus 20 and is subjected to regular caulking to produce the laminate assembly 1. Further, at this time, it is composed that the lamination height of the regularly caulked laminate assembly 1 is measured by a linear scale 27 secured at the pressurization measurement apparatus 20. The above-described pressurizing means is composed of the hydraulic servo press 21, and the measuring means is composed of the linear scale 27. As shown in FIG. 1, the press-working apparatus 10 and the pressurization measurement apparatus 20 are installed in a juxtaposed position in the forward and backward direction (the up and down direction in FIG. 1), and the press-working apparatus 10 and the pressurization measurement apparatus 20 are connected to each other by a carry-out conveyor 19 of the temporary laminate assembly 5.

Figure 2:
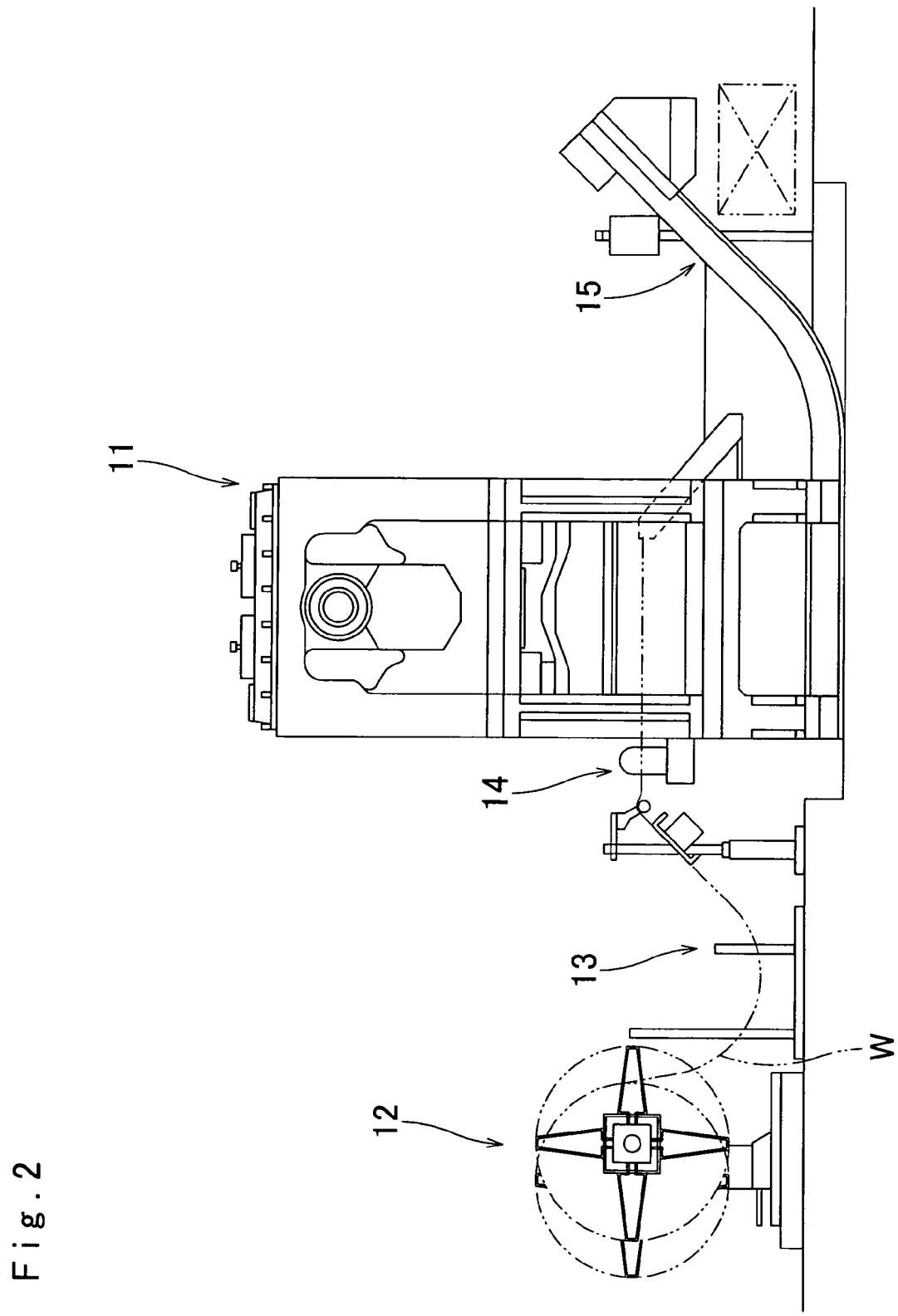
FIG. 2 is a front elevational view of a press-working apparatus.

As shown in FIG. 2, the press-working apparatus 10 is provided with the uncoiler 12, a dancer roller 13, and a feeder 14 at the carry-in side thereof and is provided with a scrap conveyor 15 at the carry-out side thereof, centering around the press 11. As shown in FIG. 1, the control apparatus 17 that controls the press-working apparatus 10 and the pressurization measurement apparatus 20 is disposed backward of the carry-out side of the press 11.

Figure 8:
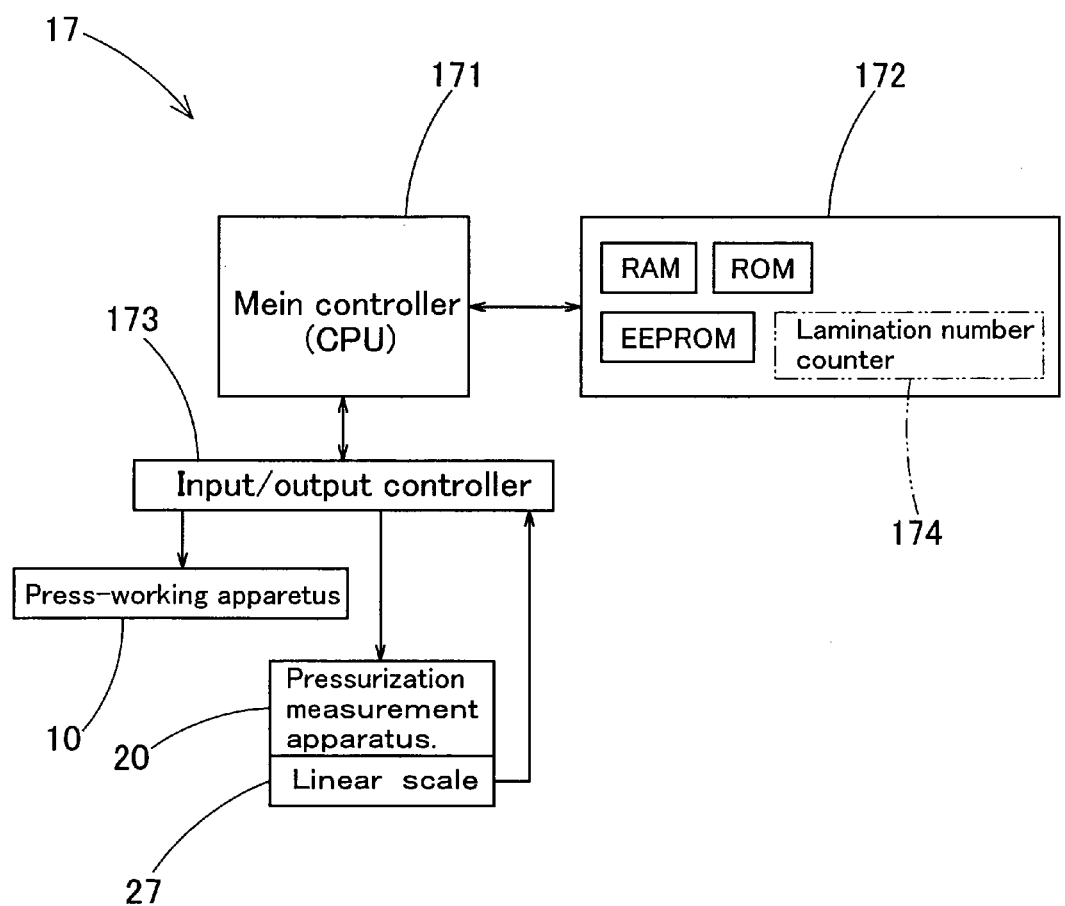
FIG. 8 is a block diagram showing a brief structure of a control apparatus 17.

The control apparatus 17 is basically composed of a microcomputer as shown in FIG. 8, and is internally provided with a main controller 171 for executing a control process of the press-working apparatus 10 and the pressurization measurement apparatus 20 and a process for determining the increase or decrease in the number of thin plates to be laminated, a memory device 172 for storing various types of data, and an input and output controller 173 for executing input and output processes of various types of signals.

The memory device 172 is provided with a ROM for storing basic program data, a RAM for taking in measurement data, etc., at random, which composes a work area of the main controller, and an EEPROM for storing programmable data of a user. The press-working apparatus 10 and the pressurization measurement apparatus 20 are connected to the input/output controller 173, and the linear scale 27 for measuring the lamination height of the laminate assembly 1 is also connected thereto. A lamination number counter 174, which sets the number of thin plates to be laminated of a laminate assembly laminated by the press-working apparatus 10, is composed so as to be set in a specified area of the RAM of, for example, the memory device 172 and to count the number of thin plates to be laminated, by software executed by the CPU of the main controller 171.

The main controller 171 of the control apparatus 17 is composed so that the main controller 171 takes in measurement data of the lamination height of the laminate assembly 1 measured by the linear scale 27 secured at the hydraulic servo press 21 of the pressurization measurement apparatus 20, determines the increase or decrease in the number of thin plates to be laminated based on the preset lamination height T of the laminate assembly 1, the height dimension tolerance t1, the tolerance t2 for judging the number of thin plates for a plate thickness, and the measured lamination height TS, and adjusts the number of thin plates to be laminated.

As shown in FIG. 1 and FIG. 2, a band-shaped thin steel plate is wound around the uncoiler 12 in a coil shape, and the uncoiler 12 is composed so as to be able to feed the band-shaped steel plate W toward the press 11. The dancer roller 13 forms a curved portion on the band-shaped steel plate W led from the uncoiler 12 and is devised so as not to give any forced tension to the band-shaped steel plate W delivered to the press 11 by making the curved portion movable vertically. The feeder 14 is mounted at one end side of the press 11, and is devised so as to intermittently feed the band-shaped steel plate W to the press 11 with the band-shaped steel plate W grasped. The scrap conveyor 15 is arranged as a conveyance portion to discharge the remaining band-shaped steel plate W, from which lamination steel plates 3 becoming a product are removed, as scraps.

The press 11 includes a plurality of working stations that work the band-shaped steel plate W, cut and lift to form, for example, a tongue-shaped caulking part, punch it out to a predetermined shape to form laminated steel plates 3, and form a temporary laminate assembly 5 by laminating a set number of steel plates. The band-shaped steel plate W is successively sent along the conveyance direction while being subjected to formation of a caulking part and a punching-out process in the respective working stations of the press 11, and the material remaining after a number of lamination steel plates 3 are punched out from the band-shaped steel plate W is carried out to the scrap conveyor 15 as scrap.

Figure 7:
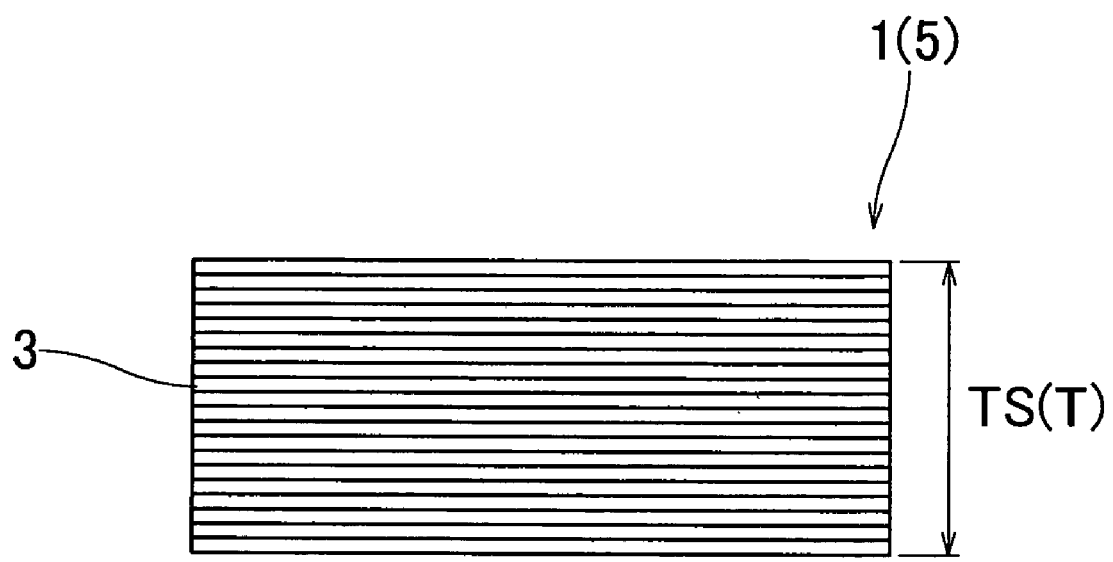
FIG. 7 is a front elevational view showing a worked laminate assembly.

The lamination steel plates 3 are vertically laminated by a predetermined number of thin plates in the final lamination station of the press 11 as shown in FIG. 7, and the laminated state thereof is maintained by the caulking parts of the lamination steel plates 3 adjacent to each other being fitted to each other and being temporarily caulked together. The caulking part is formed by, for example, cutting a part of the steel plate like a tongue and bending the part downward. In the lamination steel plates 3 vertically adjacent to each other, a downward protruding caulking part of the upper lamination steel plate 3 is fitted in a caulking recessed portion on the upper surface of the lower lamination steel plate 3, and the caulking parts are pressurized with a comparatively small load in the up and down lamination direction, wherein a temporary caulking process of a laminate assembly is carried out. By the temporary caulking process, the lamination steel plates 3 are laminated by a predetermined number and are subjected to temporary caulking, thereby forming a temporary laminate assembly 5.

The number of lamination steel plates 3 to be laminated to form the temporary laminate assembly 5 is determined by the number of thin plates set in the lamination number counter 174, which is provided in the control apparatus 17, and the number of lamination steel plates 3 to be laminated is adjusted by increasing or decreasing the value set in the lamination number counter 174. In the temporary laminate assembly 5, the adhesion degree between the respective lamination steel plates 3 is made rough, and the temporary laminate assembly 5 is delivered to the pressurization measurement apparatus 20 via the conveyor 19 in order to be subjected to regular caulking by a pressurization process in the next pressurization measurement apparatus 20 and to be turned into a laminate assembly 1 as a product.

The construction of the conveyor 19 is not particularly limited. In the embodiment, a belt conveyor that is provided with an endless moving belt is used. One end of the conveyor 19 is disposed at the front side of the press 11 opposed to the final station of the press 11, and the other end thereof is disposed at the position opposed to one end of the conveyance portion 28 of the pressurization measurement apparatus 20. Further, the temporary laminate assembly 5 is pressed by a cylinder 16 arranged at the rear part of the press 11 and is delivered from the press 11 toward the pressurization measurement apparatus 20 on the conveyor 19 as shown in FIG. 1.

A hydraulic servo press 21 is arranged in the pressurization measurement apparatus 20 in order to pressurize the temporary laminate assembly 5 in the lamination direction for regular caulking. The hydraulic servo press 21 includes, as shown in FIG. 4, a main body frame 22, a hydraulic pressure unit 23 disposed on the upper part of the main body frame 22, a slide 24 coupled to the hydraulic pressure unit 23 and arranged to be vertically movable, and a work support base 25 for supporting a laminate assembly 1.

Figure 5:
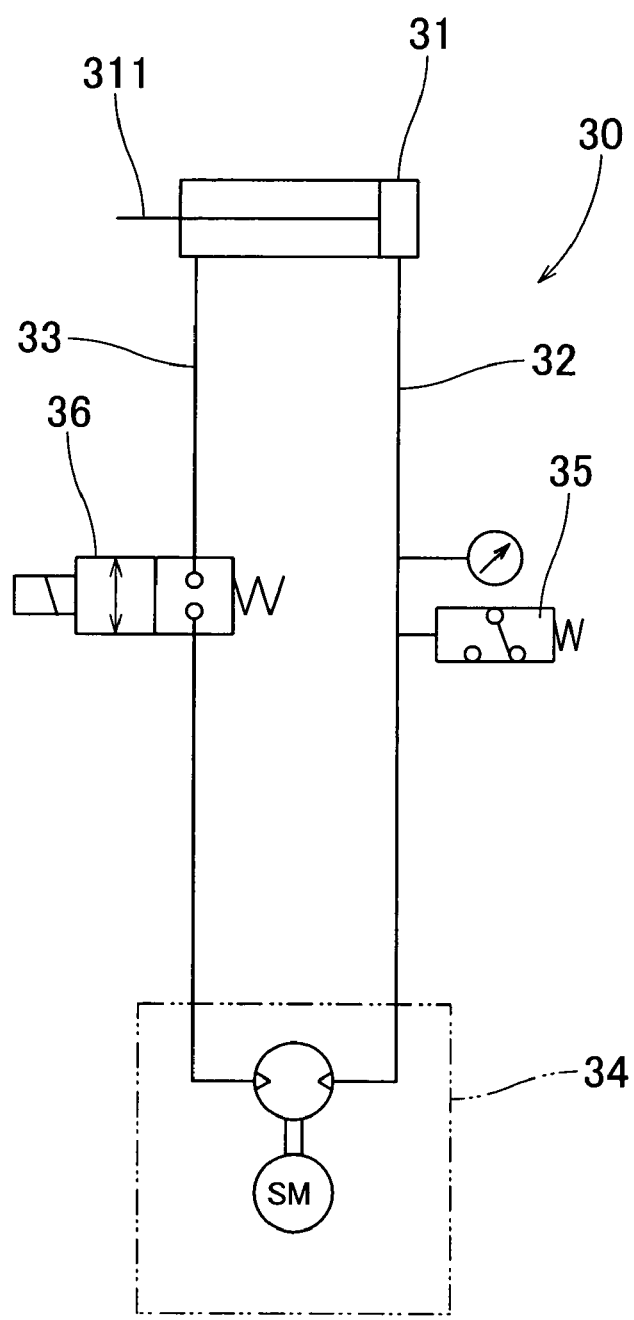
FIG. 5 is a circuit diagram showing hydraulic circuits of a hydraulic servo press of the pressurization measurement apparatus shown in FIG. 4.

The hydraulic pressure unit 23 is actuated by a hydraulic circuit 30 shown in FIG. 5. The hydraulic pressure unit 23 is constructed to be changed over to two pressure levels, one of which is the first pressure to pressurize at high pressure for regular caulking, and the other of which is the second pressure to pressurize at low pressure for measurement. Changeover from the first pressure to the second pressure is carried out by adjusting the hydraulic pressure.

That is, as shown in FIG. 5, the hydraulic circuit 30 according to the embodiment is provided with a servo pump unit 34 connected to both ends of a hydraulic cylinder 31 via an inflow-side hydraulic pressure passage 32 and an outflow side hydraulic pressure passage 33, a pressure sensor 35 disposed at an intermediate part of the inflow-side hydraulic pressure passage 32, and a valve 36 disposed at an intermediate part of the outflow side hydraulic pressure passage 33. The servo pump unit 34 has a function of adjusting the hydraulic pressure and is composed so as to be changed to the first pressure and the second pressure. As shown in FIG. 4, a piston rod 311 is disposed in the hydraulic cylinder 31 so as to reciprocate therein, and the distal end of the piston rod 311 is coupled to the slide 24.

Figure 4:
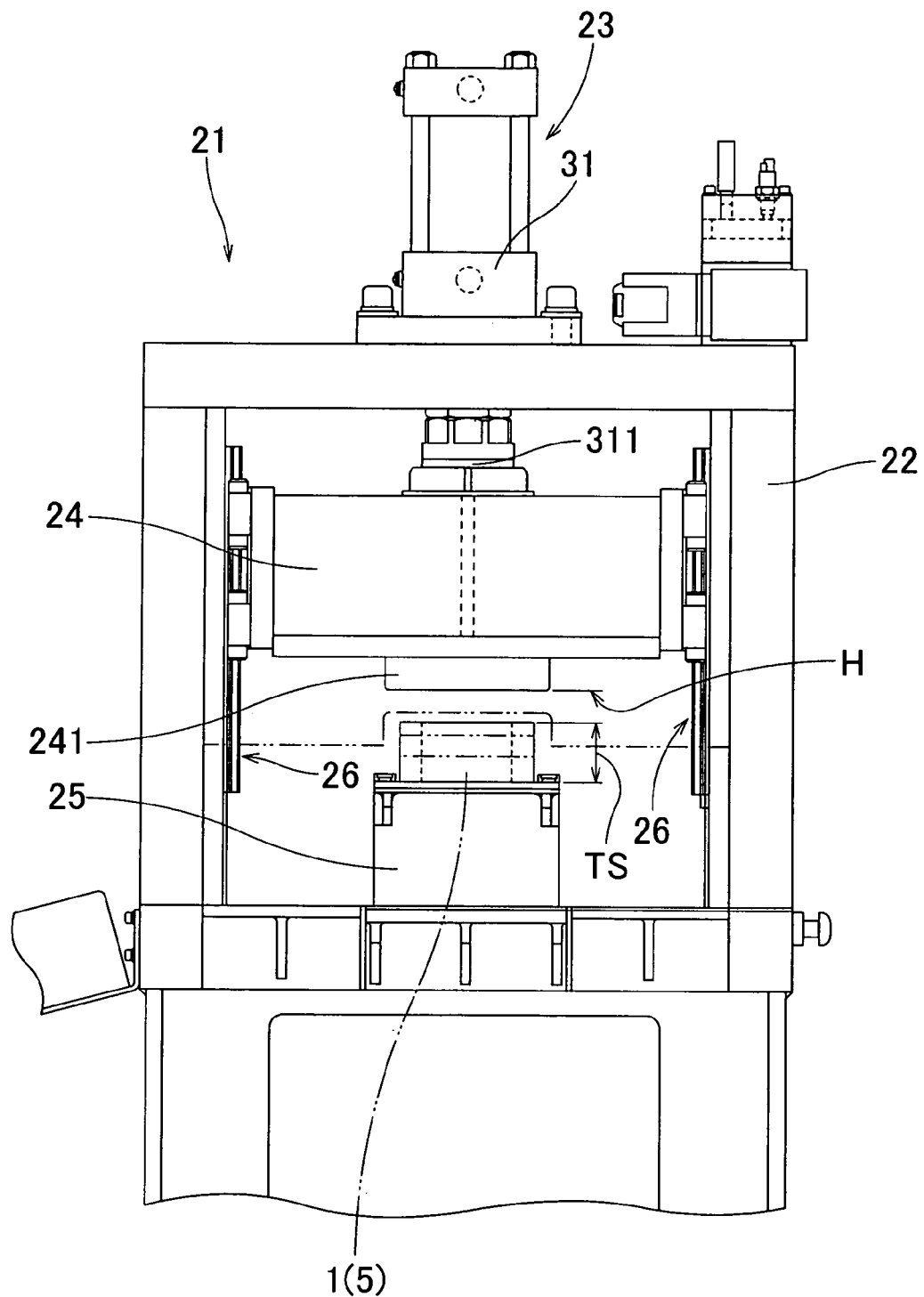
FIG. 4 is a side elevational view showing a pressurization measurement apparatus.

The slide 24 is moved and guided, as shown in FIG. 4, by a slide guide 26 mounted on the main body frame 22 at the side surface thereof, and a pressurization block 241 to pressurize a temporary laminate assembly 5 from upward is mounted on the under surface of the slide 24.

Figure 6:
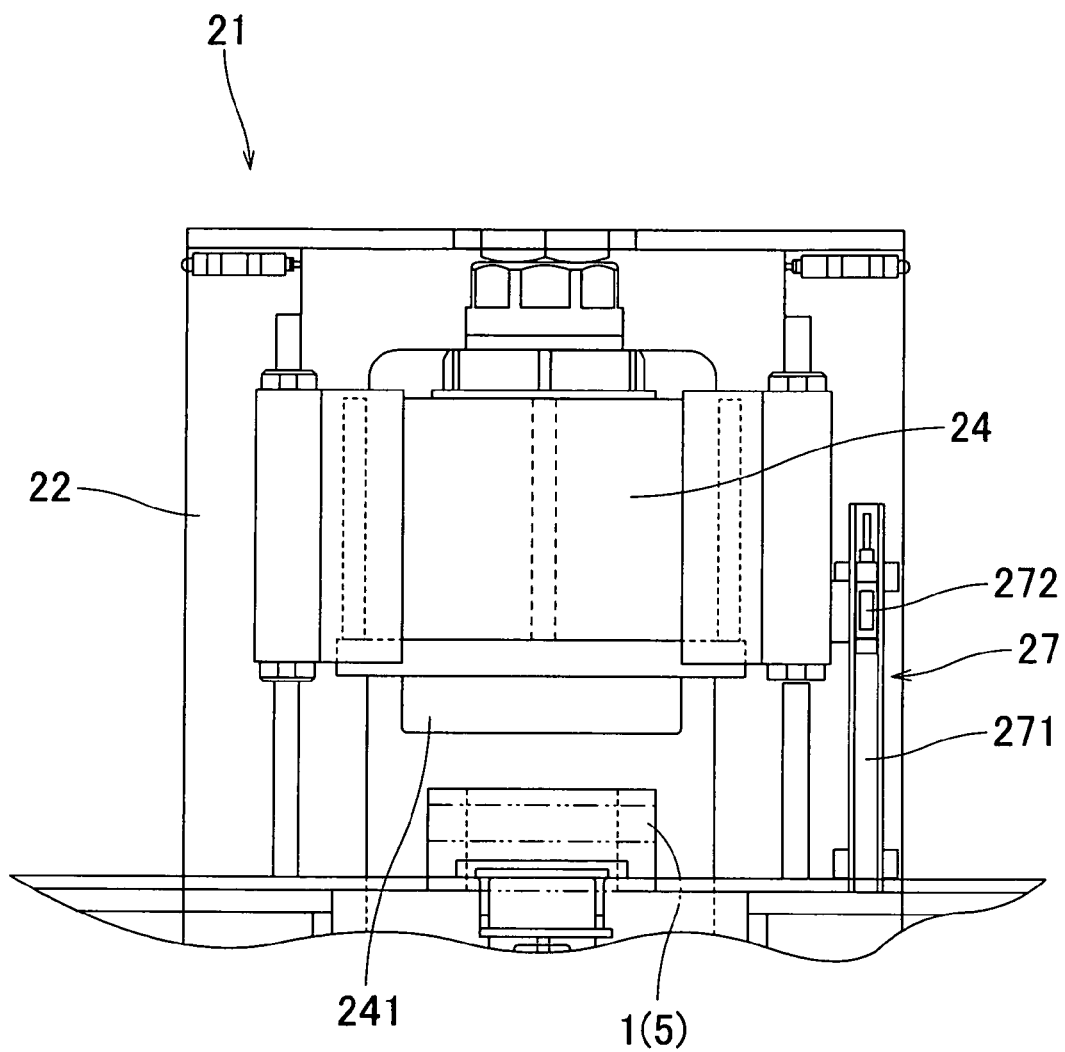
FIG. 6 is an enlarged front elevational view showing the periphery of a slide of the hydraulic servo press.

In addition, as shown in FIG. 6, the linear scale 27 is mounted between the slide 24 and the main body frame 22, and the linear scale 27 measures the height position of the slide 24, that is, the lamination height of the laminate assembly 1, and outputs the measurement data.

The linear scale 27 is provided with a fixing portion 271 mounted longer in the longitudinal direction on the main body frame 22 and a movable portion 272 mounted at one end of the slide 24 and vertically movable with respect to the fixing portion 271. The linear scale 27 is structured so as to accurately measure the absolute position of the movable portion 272 with respect to the fixing portion 271 optically or magnetically. When the hydraulic servo press 21 causes the slide 24 to go down and pressurizes the upper surface of the temporary laminate assembly 5 by the pressurization block 241, the movable portion 272 of the linear scale 27 goes down along with the slide 24, wherein the upper surface position of the regularly caulked laminate assembly 1 is measured as the lamination height, and the linear scale 27 outputs the measurement lamination height data to the control apparatus 17.

As shown in FIG. 1, a conveyance portion 28 is disposed in the pressurization measurement apparatus 20 so as to be inserted through the hydraulic servo press 21, and both end parts of the conveyance portion 28 are disposed to protrude from both sides of the hydraulic servo press 21. At the carry-in side 281 of the conveyance portion 28, the end part thereof is disposed at the position opposed to the conveyor 19, and a conveyance space 29 that discharges the measured laminate assembly 1 as a conforming article and carries it out as a non-conforming article is provided at the carry-out side 282. Judgment of the laminate assembly 1 for a conforming article or a non-conforming article is processed based on the measurement lamination height, the preset lamination height, the height dimension tolerance, and the tolerance for judging the number of thin plates of a laminate assembly by the main controller 171 of the control apparatus 17 as described later.

Figure 9:
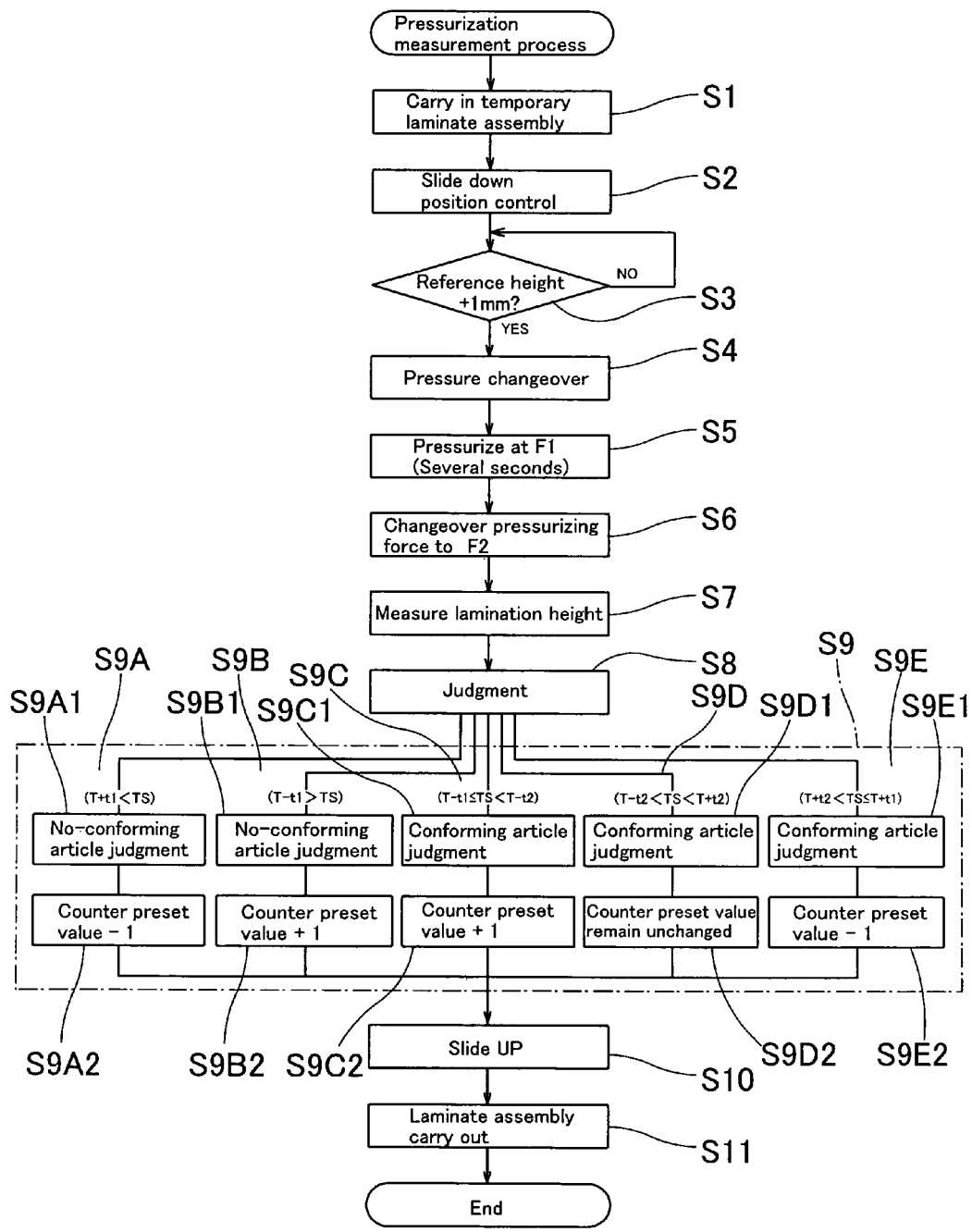
FIG. 9 is a flowchart showing a control action of the control apparatus 17.

Next, a description is given of a method for producing a laminate assembly according to the present invention along with movements of the production line M based on the flowchart of FIG. 9. Also, in the following description, it is assumed that the set lamination height of the set laminate assembly 1 is "T", the measurement lamination height of the measured laminate assembly 1 is "TS", the height dimension tolerance of the laminate assembly 1 is "t1", and the tolerance for judging the number of thin plates to be laminated of the laminate assembly 1 is "t2".

The band-shaped steel plate W unwound from the uncoiler 12 is grasped by the feeder 14 and is fed into the press 11 while being bent by the dancer roller 13. In the press 11, respective types of workings are carried out by a plurality of stations, and after, for example, tongue-shaped caulking parts are formed by cutting and lifting at predetermined positions of the band-shaped steel plate W, the lamination steel plates 3 are punched out to a predetermined shape, and are laminated by the number of plates to be laminated, which is set by the lamination number counter 174. A laminate assembly of the laminated steel plates 3 is temporarily caulked in the final station, wherein the caulking parts of the lamination steel plates 3 vertically adjacent to each other are fitted to each other, and the temporary laminate assembly 5 is brought about. The temporary laminate assembly 5 is pressurized at a small load to such a degree that the caulking parts of the respective lamination steel plates 3 are not disengaged from each other, and temporarily caulked together.

Figure 3:
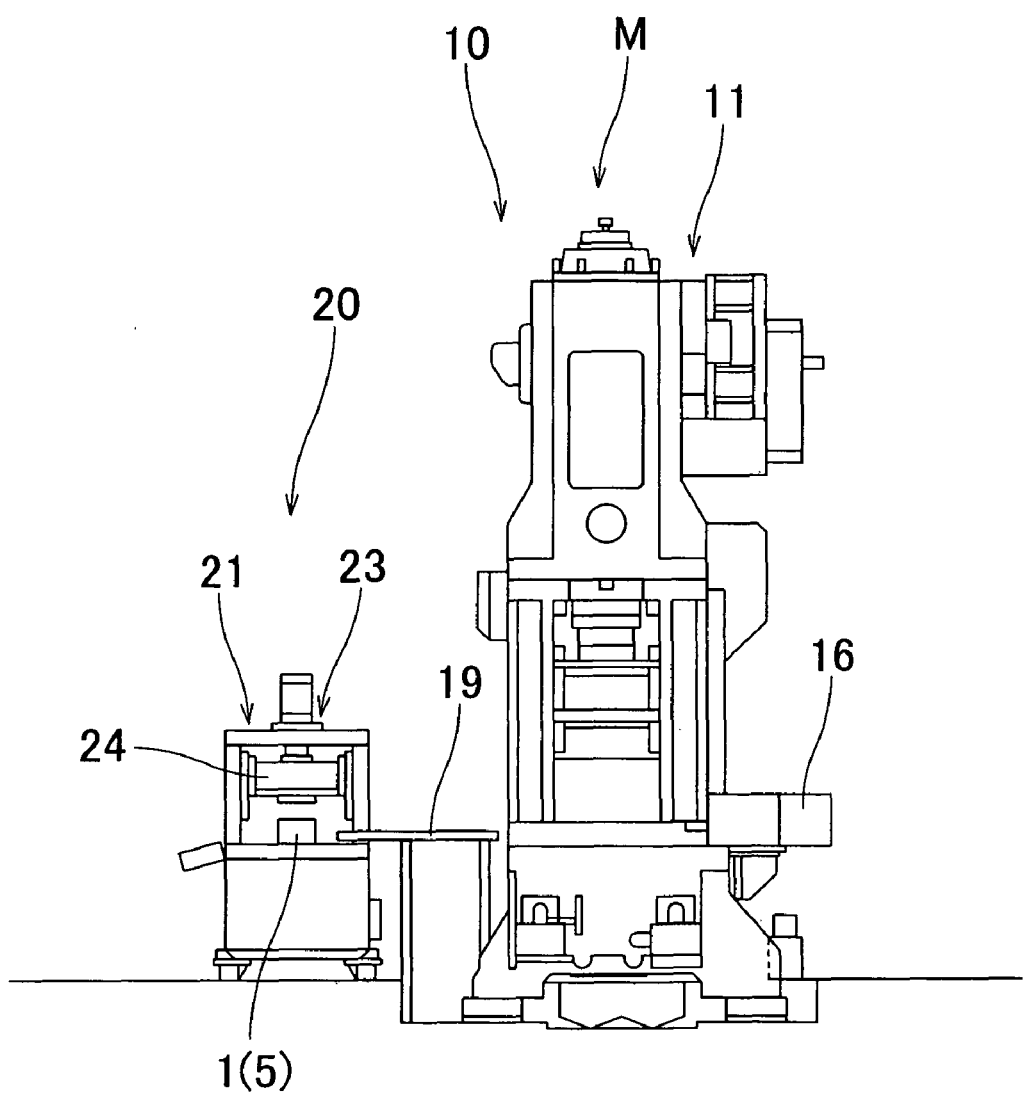
FIG. 3 is a side elevational view showing the production line.

The temporary laminate assembly 5 is pushed forward by the cylinder 16 disposed rearward of the final station of the press 11, which is shown in FIG. 1 and FIG. 3, and is moved onto the conveyor 19. The temporary laminate assembly 5 moved on the conveyor 19 is delivered by the conveyor 19, and is moved onto the conveyance portion 28 of the pressurization measurement apparatus 20. In the pressurization measurement apparatus 20, the temporary laminate assembly 5 moved to the carry-in side 281 of the conveyance portion 28 is grasped by, for example, a finger robot (not illustrated), and is delivered into the hydraulic servo press 21.

In the hydraulic servo press 21, the temporary laminate assembly 5 thus carried in is subjected to regular caulking by pressurization of the slide 24 and is formed as the laminate assembly 1. The laminate assembly 1 is, as shown in FIG. 7, formed with the lamination steel plates 3 adhered to each other without any gaps between the lamination steel plates 3 in which respective lamination steel plates 3 are vertically adjacent to each other by the regular caulking. The lamination height of a produced laminate assembly 1 is measured as the height position of the slide 24 by means of the linear scale 27, the measurement data of the measurement lamination height TS is sent to the control apparatus 17, and the main controller 171 of the control apparatus 17 adjusts so as to add a single plate to or subtract a single plate from the number of thin plates to be laminated of the laminate assembly 1 based on the set lamination height T of the laminate assembly 1, the measurement lamination height TS of the laminate assembly 1, the height dimension tolerance t1 of the laminate assembly 1, and the tolerance t2 for judging the number of thin plates.

That is, in the main controller 171 of the control apparatus 17, first, the temporary laminate assembly 5 is carried into the hydraulic servo press 21 in Step S1 as shown in the flowchart of FIG. 9. At this time, the slide 24 of the hydraulic servo press 21 is positioned at the set starting height position H as shown in FIG. 4. The starting height position H shows the height position of the under surface of the pressurization block 241 mounted on the under surface of the slide 24, and is set to a position upward by, for example, 10 mm than the preset lamination height T of the laminate assembly 1.

In the next Step S2, the hydraulic servo press 21 is driven and controlled to cause the slide 24 to go down. At this time, in Step S3, the main controller 171 determines whether the lower end position of the pressurization block 241 at the lower part of the slide 24 reaches, for example, 1 mm above the preset reference height of the temporary laminate assembly 5, based on the height measurement data transmitted from the linear scale 27, and when the corresponding lower end position reaches 1 mm above the reference height of the temporary laminate assembly 5, the main controller 171 advances to Step S4, and changes the pressure from a comparatively low elevation pressure to a pressurizing force for regular caulking. At this time, the hydraulic force in the hydraulic circuit 30 is changed over to the first pressure F1 capable of executing regular caulking. Changeover of pressure is carried out by controlling the servo pump unit 34 shown in FIG. 5. Although the first pressure F1 differs in accordance with the number of thin plates to be laminated of the lamination steel plate 3, the first pressure F1 is set to a sufficient pressure, for example, 5 tons through 10 tons, which is capable of forming a laminate assembly 1 having a fixed shape kept when the temporary laminate assembly 5 is pressurized and is subjected to regular caulking.

Such changeover of the pressure F1 of the hydraulic servo press 21 is controlled to raise the supply pressure by the servo pump unit 34 to supply hydraulic pressure. Next, in Step S5, the valve 36 of the hydraulic circuit 30 is opened to supply hydraulic pressure supplied from the servo pump unit 34 from the inflow-side hydraulic pressure passage 32 to the hydraulic cylinder 31, thereby moving the piston rod 311 of the hydraulic cylinder 31. Therefore, the slide 24 and the pressurization block 241 are caused to go down, wherein the pressurization block 241 is brought into contact with the temporary laminate assembly 5 and the pressurization is maintained for several seconds in a state where the temporary laminate assembly 5 is pressurized at the pressure F1. Accordingly, the respective lamination steel plates 3 of the temporary laminate assembly 5 are adhered to each other without any gaps, and the caulking parts thereof are subjected to regular caulking to form the laminate assembly 1.

Next, in Step S6, the pressurizing force of the hydraulic servo press 21 is changed to the second pressure F2 by controlling the hydraulic pressure supplied from the servo pump unit 34 in a state where the slide 24 is at pause, that is, the laminate assembly 1 is pressurized, as in the above description. The second pressure F2 is set to a lower pressure than the first pressure F1, for example, 1 ton. The second pressure F2 becomes the reference pressure when measuring the lamination height of the laminate assembly 1. The second pressure F2 is set to a pressure capable of accurately measuring the lamination height of the produced laminate assembly 1, wherein the lamination height of the laminate assembly 1 is measured under the second pressure F2.

Then, in Step S7, the lamination height of the laminate assembly 1 is measured by the linear scale 27, and the measurement data of the measurement lamination height TS being the measurement value is output from the linear scale 27 to the control apparatus 17. That is, in the hydraulic servo press 21, the linear scale 27 measures the absolute position on the lower surface of the pressurization block 241, that is, the distance from the upper surface of the work supporting base 25 to the lower surface position of the pressurization block 241 in a state where the slide 24 pressurizes the laminate assembly 1 at the second pressure F2, whereby the measurement lamination height TS of the laminate assembly 1 will be measured.

Next, in step S8, the main controller 171 of the control apparatus 17 compares the preset lamination height T of the laminate assembly 1 with the measured lamination height TS of the laminate assembly 1, and judges the produced laminate assembly 1 for a conforming article or a non-conforming article. The main controller 171 further adjusts so as to add a single plate to or subtract a single plate from the number of thin plates to be laminated of the temporary laminate assembly 5 when producing the same, or so as to cause the number of thin plates to remain unchanged based on the set lamination height T, the measurement lamination height TS, the height dimension tolerance t1 of the laminate assembly 1, and the tolerance t2 for judging the number of thin plates of the laminate assembly.

That is, in Step S8, the main controller 171 judges the laminate assembly 1 to be a non-conforming article where the measured lamination height TS of the laminate assembly 1 exceeds the upper limit value of or goes below the lower limit value of the height dimension tolerance t1 of the laminate assembly 1 with respect to the set lamination height T, wherein the height dimension tolerance t1 of the laminate assembly 1 may be set to, for example, 0.2 through 0.3 mm.

In the judgment of Step S8, as shown in the judgment reference S9 of FIG. 9, the relationship between the set lamination height T and the measurement lamination height TS of the laminate assembly 1 is set to be classified into five levels, wherein judgment of the produced laminate assembly 1 for a conforming article or a non-conforming article and adjustment to add a thin plate to or subtract a thin plate from the number of thin plates to be laminated of the temporary laminate assembly 5 when producing the same are carried out based on the five levels of judgment references S9A through S9E.

That is, the judgment reference S9A refers to a case where the measurement lamination height TS is larger than the value obtained by adding the height dimension tolerance t1 of the laminate assembly 1 to the set lamination height T (T+t1<TS). Thus, where the measurement lamination height TS is larger than the value obtained by adding the height dimension tolerance t1 of the laminate tolerance 1 to the set lamination height T, the laminate assembly 1 is judged to be a non-conforming article in Step S9A1, and "1" is subtracted from the preset value of the lamination number counter 174 in Step S9A2. The judgment reference S9A refers to a case where an error of the measurement lamination height TS with respect to the set lamination height T increases exceeding the height dimension tolerance t1, wherein the measurement lamination height TS is made close to the set lamination height T by subtracting a single plate from the number of thin plates to be laminated.

Also, the judgment reference S9B refers to a case where the measurement lamination height TS is smaller than the value obtained by subtracting the height dimension tolerance t1 of the laminate assembly 1 from the set lamination height T (T−t1>TS). Thus, where the measurement lamination height TS is smaller than the value obtained by subtracting the height dimension tolerance t1 of the laminate assembly 1 from the set lamination height, in Step S9B1, the laminate assembly 1 is judged to be a non-conforming article. In Step S9B2, "1" is added to the preset value of the lamination number counter 174. The judgment reference S9B refers to a case where an error of the measurement lamination height TS with respect to the set lamination height T decreases beyond the height dimension tolerance t1, wherein, by adding a single thin plate to the number of thin plates to be laminated, the measurement lamination height TS can be made close to the set lamination height T.

The judgment reference S9C refers to a case where the measurement lamination height TS is equal to or larger than the value obtained by subtracting the height dimension tolerance t1 of the laminate assembly 1 from the set lamination height T, and is smaller than the value obtained by subtracting the tolerance t2 for judging the number of thin plates from the set lamination height T (T−t1≦TS<T−t2). Thus, where the measurement lamination height TS is equal to or larger than the value obtained by subtracting the height dimension tolerance t1 of the laminate assembly 1 from the set lamination height T and is smaller than the value obtained by subtracting the tolerance t2 for judging the number of thin plates from the set lamination height T, in step S9C1, the laminate assembly 1 is judged to be a conforming article, and in Step S9C2, "1" is added to the preset value of the lamination number counter 174. The judgment reference S9C refers to a case where an error of the measurement lamination height TS with respect to the set lamination height T is within the height dimension tolerance t1, and the measurement lamination height TS is smaller below the tolerance t2 for judging the number of thin plates. The laminate assembly 1 is a conforming article, however, by adding a single thin plate to the number of thin plates to be laminated, the measurement lamination height TS can be made closer to the set lamination height T.

The judgment reference S9D refers to a case where the measurement lamination height TS is larger than the value obtained by subtracting the tolerance t2 for judging the number of thin plates from the set lamination height T and is smaller than the value obtained by adding the tolerance t2 for judging the number of thin plates to the preset lamination height T ($T-t2<TS<T+t2$). Thus, where the measurement lamination height TS is larger than the value obtained by subtracting the tolerance t2 for judging the number of thin plates from the set lamination height T and is smaller than the value obtained by adding the tolerance t2 for judging the number of thin plates to the set lamination height T ($T-t2<TS<T+t2$), in Step S9D1, the laminate assembly 1 is judged to be a conforming article, and in Step S9D2, the preset value of the lamination number counter 174 may remain unchanged. The judgment reference S9D refers to a case where the error of the measurement lamination height TS with respect to the set lamination height T is smaller within the tolerance t2 for judging the number of thin plates, the laminate assembly 1 is made into a conforming article, and the number of thin plates to be laminated of the laminate assembly 1 is maintained as it is.

The judgment reference S9E refers to a case where the measurement lamination height TS is larger than the value obtained by adding the tolerance t2 for judging the number of thin plates to the set lamination height T, and is equal to or smaller than the value obtained by adding the height dimension tolerance t1 to the set lamination height T ($T+t2<TS\leq T+t1$). Thus, where the measurement lamination height TS is larger than the value obtained by adding the tolerance t2 for judging the number of thin plates to the set lamination height T, and is equal to or smaller than the value obtained by adding the height dimension tolerance t1 to the set lamination height T ($T+t2<TS\leq T+t1$), in Step S9E1, the laminate assembly 1 is judged to be a conforming article, and in Step S9E2, the preset value of the lamination number counter 174 is subtracted by "1." The judgment reference S9E refers to a case where the error of the measurement lamination height TS with respect to the set lamination height T is within the height dimension tolerance t1 and the measurement lamination height TS is larger exceeding the tolerance t2 for judging the number of thin plates, wherein the laminate assembly 1 is judged to be a conforming article. However, by subtracting a single thin plate from the number of thin plates to be laminated, the measurement lamination height TS can be made closer to the set lamination height T.

Also, the tolerance t2 for judging the number of thin plates, which is used to determine a conforming article or a non-conforming article with respect to the number of thin plates to be laminated of the laminate assembly 1 and to add or subtract the number of thin plates to be laminated of the laminate assembly 1, is set to approximately 0.02 through 0.05 mm, for example, where the set lamination height T is 65 mm through 80 mm.

As described above, in Step S7, the lamination height of the laminate assembly 1 is measured by the linear scale 27, and the measurement data of the measurement lamination height TS being the measured value thereof is output from the linear scale 27 to the control apparatus 17, and the main controller 171 compares the preset lamination height T of the laminate assembly 1 with the measured lamination height TS of the laminate assembly 1 in Step 8.

At this time, where the relationship between the set lamination height T and the measurement lamination height TS corresponds to, for example, the above-described judgment reference S9A ($T+t1<TS$), the measurement lamination height TS exceeds the upper limit of the tolerance of the set lamination height T, the main controller 171 judges, in Step S9A1, that the laminate assembly 1 is a non-conforming article, and subtracts a single thin plate from the preset value of the lamination number counter 174. Therefore, the control apparatus 17 will control the press-working apparatus 10 so that the number of thin plates to be laminated of the lamination steel plate 3 of the temporary laminate assembly 5 which the press-working apparatus 10 newly works is subtracted by one. Next, in Step S11, the corresponding laminate assembly 1 is moved to a conveyance space 29 for non-conforming articles and is discharged therefrom in Step S12 after the slide 24 of the hydraulic servo press 21 is moved upward in Step S11.

On the other hand, where the relationship between the set lamination height T and the measurement lamination height TS corresponds to, for example, the above-described judgment reference S9B ($T-t1>TS$), the measurement lamination height TS of the laminate assembly 1 goes below the lower limit of the tolerance of the set lamination height T, and the main controller 171 judges, in Step S9B1, that the laminate assembly 1 is a non-conforming article, and adds a single thin plate to the preset value of the lamination number counter 174. Therefore, the control apparatus 17 will control the press-working apparatus 10 so that the number of thin plates to be laminated of the lamination steel plate 3 of the temporary laminate assembly 5 which the press-working apparatus 10 newly works is increased by one. Next, in Step S11, the corresponding laminate assembly 1 is moved to a conveyance space 29 for non-conforming articles and is discharged therefrom in Step S12 after the slide 24 of the hydraulic servo press 21 is moved upward in Step S11.

On the other hand, where the relationship between the set lamination height T and the measurement lamination height TS corresponds to, for example, the above-described judgment reference S9C ($T-t1\leq TS<T-t2$), since the measurement lamination height TS is equal to or larger than the value obtained by subtracting the height dimension tolerance t1 of the laminate assembly 1 from the set lamination height T, and is smaller than the value obtained by subtracting the tolerance t2 for judging the number of thin plates from the set lamination height T, the main controller 171 judges, in Step S9C1, that the laminate assembly 1 is a conforming article, and in Step S9C2, "1" is added to the preset value of the lamination number counter 174. Therefore, the control apparatus 17 will control the press-working apparatus 10 so that the number of thin plates to be laminated of the lamination steel plates 3 of the temporary laminate assembly 5 which the press-working apparatus 10 newly works is increased by one. Next, in Step S11, after the slide 24 of the hydraulic servo press 21 is moved upward, the corresponding laminate assembly 1 is moved to the conveyance space 29 for non-conforming articles and is discharged therefrom in Step S12.

On the other hand, where the relationship between the set lamination height T and the measurement lamination height TS corresponds to, for example, the above-described judgment reference S9D ($T-t2<TS<T+t2$), since the measurement lamination height TS is larger than the value obtained by subtracting the tolerance t2 for judging the number of thin plates from the set lamination height T and is smaller than the value obtained by adding the tolerance t2 for judging the number of thin plates to the set lamination height T, the main controller 171 judges, in S9D1, that the laminate assembly 1 is a conforming article, and in Step S9D2, causes the preset value of the lamination number counter 174 to remain unchanged. Next, in Step S11, after the slide 24 of the hydraulic servo press 21 is elevated, the corresponding laminate assembly 1 is moved to the conveyance space 29 for non-conforming articles and is discharged therefrom in Step S12.

On the other hand, where the relationship between the set lamination height T and the measurement lamination height TS corresponds to, for example, the above-described judgment reference S9E (T+t2<TS≦T+t1), since the measurement lamination height TS is larger than the value obtained by adding the tolerance t2 for judging the number of thin plates to the set lamination height T and is equal to or smaller than the value obtained by adding the height dimension tolerance t1 to the set lamination height T, the main controller 171 judges, in S9E1, that the laminate assembly 1 is a conforming article, and in Step S9E2, subtracts a single plate from the preset value of the lamination number counter 174, wherein the control apparatus 17 controls the press-working apparatus 10 so that a single plate is subtracted from the number of thin plates to be laminated of the lamination steel plates 3 of the temporary laminate assembly 5 which the press-working apparatus 10 newly works. Next, in Step S11, after the slide 24 of the hydraulic servo press 21 is elevated, the corresponding laminate assembly 1 is moved to the conveyance space 29 for non-conforming articles and is discharged therefrom in Step S12.

Thus, since Steps S1 through S11 are repeated by the main controller 171 in the press-working apparatus 10 and the pressurization measurement apparatus 20 of the above-described production line M, the temporary laminate assembly 5 laminated in the press-working apparatus 10 is subjected to regular caulking in the pressurization measurement apparatus 20 and makes the same into a laminate assembly 1. Then, the lamination height of the laminate assembly 1 is measured by the linear scale 27. Further, the number of thin plates to be laminated is adjusted by the press-working apparatus 10 so that the number of thin plates to be laminated of the laminate assembly 1 is added or subtracted by one based on the set lamination height T of the laminate assembly 1, the measured lamination height TS of the laminated assembly 1, the height dimension tolerance t1 of the laminate assembly 1, and the tolerance t2 for judging the number of thin plates. Therefore, the measurement result of the measurement lamination height TS of a produced laminate assembly 1 is reflected in the lamination operation of the preceding press-working apparatus 10, wherein the lamination height of the laminate assembly 1 which is newly worked will be accommodated within the tolerance of the set lamination height T, the ratio of non-conforming articles resulting from the defective lamination height can be reduced to a large extent, and the yield of the production line can be improved.

In addition, in the production line M according to the above-described embodiment, since the press-working apparatus 10 and the pressurization measurement apparatus 20 are separated from each other and the conveyor 19 that delivers a temporary laminate assembly 5 is installed between the press-working apparatus 10 and the pressurization measurement apparatus 20, the press 11 disposed in the press-working apparatus 10 can be made into a small-sized press, and the hydraulic servo press 21 of the pressurization measurement apparatus 20 can be made into a small-sized press, wherein the costs for facilities can be reduced.

Further, in the production line M according to the embodiment, the first pressure F1 for regular caulking and the second pressure F2, which is used for pressurization measurement and is lower than the first pressure F1, are separately set, and the lamination height of a laminate assembly 1 can be measured under a still lower second pressure F2, wherein the lamination height of the laminate assembly 1 can be accurately measured, and it is possible to improve the quality and accuracy of laminate assemblies produced. Further, since the lamination height of the laminate assembly 1 is measured by the linear scale 27 that measures the height position of the slide 24 of the hydraulic servo press 21, accurate measurement can be carried out with a simple structure.

Still further, the production line for a laminate assembly according to the present invention is not limited to the above-described embodiment. For example, when measuring the lamination height of a laminate assembly, the lamination height may be measured in a state where the first pressure for regular caulking is applied, without setting the first pressure and the second pressure.

Furthermore, the thickness of lamination steel plate 3 that forms a laminate assembly 1, the number of thin plates to be laminated, and the values of the first pressure for pressurizing when a temporary laminate assembly 5 is regularly caulked, and the values of the second pressure for pressurization for measurement may be appropriately set, depending on the material of the lamination steel plates 3 and the number of plates to be laminated.

In addition, if a laminate assembly worked by the method and the production line for a laminate assembly according to the present invention is a laminate assembly in which thin plates are laminated, the laminate assembly is not limited to a motor core but may be another laminate assembly.

What is claimed is:

1. A method for producing a laminate assembly, comprising the steps of:
    forming a laminate assembly by laminating thin plates, which are punched out by press-working means, by a set number of thin plates by laminating means;
    measuring a lamination height of the laminate assembly by measuring means; and
    controlling said laminating means to adjust a set number of thin plates to be laminated of the laminate assembly by addition and subtraction so that a measurement lamination height is matched to a set lamination height by controlling means using a measured lamination height, a preset lamination height, a height dimension tolerance, and a tolerance for judging the number of thin plates after a measurement lamination height data measured by said measuring means is input into said controlling means; wherein
    said laminating step forms a temporary laminate assembly by temporarily caulking the caulking parts secured at thin plates by press-working, and said measuring step measures a lamination height of the laminate assembly in a state where the laminate assembly is pressurized at a lower measurement pressure than for a regular caulking after the temporarily caulked temporary laminate assembly is regularly caulked by being pressurized at a higher pressure than for the temporary caulking.

2. The method for producing a laminate assembly according to claim 1, wherein
    said controlling step subtracts a single thin plate from the number of thin plates to be laminated of a laminate assembly when the measurement lamination height is larger than the value obtained by adding the height dimension tolerance to the set lamination height, and adds a single thin plate to the number of thin plates to be laminated of a laminate assembly when the measurement lamination height is smaller than the value obtained by subtracting the height dimension tolerance from the set lamination height.

3. The method for producing a laminate assembly according to claim 1, wherein a produced laminate assembly is judged to be a non-conforming article when the measurement lamination height is larger than the value obtained by adding the height dimension tolerance to the set lamination height or when the measurement lamination height is smaller than the value obtained by subtracting the height dimension tolerance from the set lamination height.

4. The method for producing a laminate assembly according to claim 1, wherein said controlling step adds a single thin plate to the number of thin plates to be laminated of a laminate assembly when the measurement lamination height is equal to or larger than the value obtained by subtracting the height dimension tolerance from the set lamination height and when the measurement lamination height is smaller than the value obtained by subtracting the tolerance for judging the number of thin plates from the set lamination height.

5. The method for producing a laminate assembly according to claim 1, wherein said controlling step causes the number of thin plates to be laminated of a laminate assembly to remain unchanged when the measurement lamination height is larger than the value obtained by subtracting the tolerance for judging the number of thin plates from the set lamination height and the measurement lamination height is smaller than the value obtained by adding the tolerance for judging the number of thin plates to the set lamination height.

6. The method for producing a laminate assembly according to claim 1, wherein said controlling step subtracts a single thin plate from the number of thin plates to be laminated of a laminate assembly when the measurement lamination height is larger than the value obtained by adding the tolerance for judging the number of thin plates to the set lamination height and the measurement lamination height is equal to or smaller than the value obtained by adding the height dimension tolerance to the set lamination height.

7. The method for producing a laminate assembly according to claim 1, wherein a produced laminate assembly is judged to a be a conforming article when the measurement lamination height is equal to or larger than the value obtained by subtracting the height dimension tolerance from the set lamination height and the measurement lamination height is smaller than the value obtained by subtracting the tolerance for judging the number of thin plates from the set lamination height, when the measurement lamination height is larger than the value obtained by subtracting the tolerance for judging the number of thin plates from the set lamination height and the measurement lamination height is smaller than the value obtained by adding the tolerance for judging the number of thin plates to the set lamination height, or when the measurement lamination height is larger than the value obtained by adding the tolerance for judging the number of thin plates to the set lamination height and the measurement lamination height is equal to or smaller than the value obtained by adding the height dimension tolerance to the set lamination height.

8. A method for producing a laminate assembly, comprising the steps of:

forming a laminate assembly by laminating thin plates, which are punched out by press-working means, by a set number of thin plates by laminating means;

measuring a lamination height of the laminate assembly by measuring means; and controlling said laminating means to adjust a set number of thin plates to be laminated of the laminate assembly by addition and subtraction so that a measurement lamination height is matched to a set lamination height by controlling means using a measured lamination height, a preset lamination height, a height dimension tolerance, and a tolerance for judging the number of thin plates after a measurement lamination height data measured by said measuring means is input into said controlling means; wherein said controlling step judges, when a difference between the measured lamination height and the preset lamination height is small, that a produced laminate assembly is a conforming article, and judges, when the difference is large, that a produced laminate assembly is a non-conforming article.

9. A production line for a laminate assembly comprising:

press-working means for punching out a thin plate material by a press;

laminating means for forming a laminate assembly by laminating punched-out thin plates by a set number of thin plates;

means for measuring a lamination height of the laminate assembly; and controlling means for inputting data of measurement lamination height measured by said measuring means, determining an addition value or a subtraction value in the set number of thin plates to be laminated of the laminate assembly so that the measurement lamination height is matched to the set lamination height using the measurement lamination height, a preset lamination height, a height dimension tolerance, and a tolerance for judging the number of thin plates, and controlling so as to increase or decrease the number of thin plates to be laminated in said laminating means based on the addition or subtraction value; wherein said press-working means is structured so as to form a laminate assembly by laminating punched-out thin plates by a set number of thin plates and temporarily caulking the same, and said measuring means is provided in said pressurizing means for regularly caulking a temporarily caulked laminate assembly sent from the press-working means and is structured so as to measure the height of the laminate assembly in a state where the laminated assembly is pressurized with a smaller measurement pressurizing force than the pressurizing force for regular caulking after the laminate assembly is regularly caulked by said pressurizing means.

10. The production line for a laminate assembly according to claim 9, wherein said controlling means is provided with quality judging means for judging, when a difference between the measured lamination height and the preset lamination height is small, that a produced laminate assembly is a conforming article, and judging, when the difference is great, that the produced laminate assembly is a nonconforming article.

11. The production line for a laminate assembly according to claim 9, wherein said controlling means is provided with a lamination number counter for setting the number of thin plates to be laminated based on which said laminating means laminates thin plates, and adjusts the set number of thin plates to be laminated of a laminate assembly by adding or subtracting the value of the lamination number counter based on the measurement lamination height, height dimension tolerance and the tolerance for judging the number of thin plates.

12. The production line for a laminate assembly according to claim 9, wherein said controlling means subtracts a single thin plate from the number of thin plates to be laminated of a laminate assembly when the measurement lamination height is larger than the value obtained by adding the height dimension tolerance to the set lamination height, adds a single thin plate to the number of thin plates to be laminated of a laminate assembly when the measurement lamination height is smaller than the value obtained by subtracting the height dimension tolerance from the set lamination height, adds a single thin plate to the number of thin plates to be laminated of a laminate assembly when the measurement lamination height is equal to or larger than the value obtained by subtracting the height dimension tolerance from the set lamination height and when the measurement lamination height is smaller than the value obtained by subtracting the tolerance for judging the number of thin plates from the set lamination height, causes the number of thin plates to be laminated of a laminate assembly to remain unchanged when the measurement lamination height is larger than the value obtained by subtracting the tolerance for judging the number of thin plates from the set lamination height and when the measurement lamination height is smaller than the value obtained by adding the tolerance for judging the number of thin plates to the set lamination height, and subtracts a single thin plate from the number of thin plates to be laminated of a laminate assembly when the measurement lamination height is larger than the value obtained by adding the tolerance for judging the number of thin plates to the set lamination height and when the measurement lamination height is equal to or smaller than the value obtained by adding the height dimension tolerance to the set lamination height.

13. A production line for a laminate assembly comprising:

press-working means for punching out a thin plate material by a press;

laminating means for forming a laminate assembly by laminating punched-out thin plates by a set number of thin plates;

means for measuring a lamination height of the laminate assembly; and controlling means for inputting data of measurement lamination height measured by said measuring means, determining an addition value or a subtraction value in the set number of thin plates to be laminated of the laminate assembly so that the measurement lamination height is matched to the set lamination height using the measurement lamination height, a preset lamination height, a height dimension tolerance, and a tolerance for judging the number of thin plates, and controlling so as to increase or decrease the number of thin plates to be laminated in said laminating means based on the addition or subtraction value; wherein said measuring means is structured so as to measure the lamination height of a laminate assembly by outputting the up and down position data of a slider of a press from a movable portion or a fixing portion of a linear scale in a state where the fixing portion of the linear scale for electrically measuring the absolute position of the movable portion is fixed at the main body frame of the press used as said pressurizing means, and the movable portion of the linear scale is fixed at the slider of the press.

* * * * *